March 2, 1971 R. C. LANGLEY ET AL 3,567,383

HYDROGEN DETECTORS

Filed Oct. 1, 1968

INVENTORS
ROBERT C. LANGLEY
LEONARD R. RUBIN

BY

*Miriam U. Leff*
*Samuel ...*

ATTORNEYS

United States Patent Office 3,567,383
Patented Mar. 2, 1971

3,567,383
HYDROGEN DETECTORS
Robert C. Langley, Millington, and Leonard R. Rubin, Union, N.J., assignors to Engelhard Minerals & Chemicals Corporation, Newark, N.J.
Filed Oct. 1, 1968, Ser. No. 764,271
Int. Cl. G01n 27/12, 27/26
U.S. Cl. 23—230                              11 Claims

ABSTRACT OF THE DISCLOSURE

A detector for hydrogen has as its sensing device a thin film comprised of palladium or platinum oxide which oxide on contact with hydrogen reduces to the corresponding metal. Differences in properties, e.g. electrical or optical, of the oxide and metallic films are used to detect the presence of hydrogen.

BACKGROUND OF THE INVENTION

This invention relates to a new method and devices for detecting the presence of hydrogen.

Hydrogen detectors are useful mainly to detect leaks in areas where hydrogen is stored, transferred, purified or utilized. Hydrogen is a colorless, odorless, tasteless gas which forms explosive mixtures with air over a wide range of concentrations. For example, the lower and upper limits of inflammability of hydrogen in air, determined at atmospheric pressure and room temperature, are 4.00% and 74.20% by volume. Hydrogen may also be a troublesome contaminant in closed systems, even in inert gaseous atmospheres. In order to minimize the explosive hazards of hydrogen in oxidizing atmospheres or the deleterious effects of hydrogen when present as a contaminant, its presence must be detected promptly and at low concentrations.

There has long been a need for simple, inexpensive, reliable hydrogen detectors. With the recently increased commercial and military applications of hydrogen, the need for such detectors has increased. Complicated instruments such as the optical interferometer, mass spectrometer, and infrared spectrometer, are available for detecting hydrogen. These instruments are expensive, fragile, and bulky. Other instruments heretofore employed utilize a pair of heated metal filaments that form part of a bridge circuit. When the hydrogen is combusted on the hot catalytic filament it further heats the filament, increasing its resistance and unbalancing the bridge. These devices are delicate, and environmental control is critical. They require heat and sensitive equipment, e.g. diffusion membranes. They are often expensive as well as erratic. Still another type of instrument utilizes the change in resistance of palladium on absorption of hydrogen. The palladium may be for example in the form of a wire or particles. Apart from the problem of deleterious $\beta$-phase of the palladium, a principal problem is that the increase of resistance of palladium on absorption of hydrogen is relatively small. Therefore, these instruments are relatively complex in order to develop sufficient sensitivity.

In accordance with the present invention sensitive reliable hydrogen sensing devices are used. They are of simple construction and easy to manufacture. They can be used in the atmosphere without danger of initiating combustion. They can also be used in inert gaseous streams. The devices can be used to indicate the presence of hydrogen at the site of possible leakage or they can be used to indicate to a control area in a continuous manner whether there is a leakage of hydrogen in a remote area. The devices can be used in fixed or portable systems. A very important feature of these novel sensors is that they can be used directly to automatically signal an alarm or to activate safety controls.

INVENTION

A hydrogen detector of the present invention is comprised of a substrate, a thin film comprised of palladium or platinum oxide on said substrate, which oxide on contact with hydrogen reduces to metallic form, and means responsive to a change in physical characteristics of the film which utilize this change produced by the transformation of the oxide to the metal.

Although the thin film can be comprised of palladium oxide or platinum oxide, palladium oxide is preferred since platinum oxide is difficult to make in thin film form. Therefore, the discussion below will be directed mainly to palladium oxide. It will be understood, however, that platinum oxide can be used.

Palladium oxide is readily reducible to palladium when contacted with hydrogen even when the hydrogen is present in low concentrations and even when the hydrogen is present in an oxidizing medium such as air. Furthermore the reduction occurs rapidly even at room temperatures. Contrastingly, base metal oxide films, e.g. of CuO, PbO, NiO, or $Co_2O_3$ require high temperatures for reduction to the metal even in a reducing atmosphere. For example thin films of PbO, $Co_2O_3$ and NiO require temperatures of over 300° C. for extended periods of time in essentially pure hydrogen to be converted to the metals. If oxygen were present, the conditions would have to be even more severe. Precious metal oxides other than palladium oxide present other problems. As noted above, platinum oxide is known to reduce in hydrogen at room temperature and could be used to detect hydrogen, but platinum oxide is difficult to make in thin film form. Oxides of ruthenium and osmium volatilize too readily and are poisonous. Rhodium oxide can also be used to detect hydrogen at room temperature but its reduction rate is slow compared to that of palladium oxide. Silver oxide would reduce in hydrogen at moderate temperatures, though probably not at room temperature, but since it converts readily to a stable sulfide, it is not a practical compound for use in detecting hydrogen.

The difference in physical characteristics of palladium oxide and palladium films are well known. For example, palladium oxide has a high electrical resistance and palladium has a low electrical resistance. A thin palladium oxide film is transparent and a thin palladium film is reflective. Means responsive to such changes in physical characteristics are also well known. For example a simple voltage divider circuit may be used to respond to a change in resistance across terminals in contact with the palladium oxide film, or a photoelectric cell combined with a light source can be used to detect a change in reflectivity of a surface.

The thin film which is comprised essentially of palladium oxide, may also contain oxides of precious metals other than palladium and oxides of base metals. For example, when the thin film is deposited on a glass substrate, $SiO_2$ may be incorporated in the film to increase the adherence of the film to the substrate. The film may in addition contain metals such as silver or gold. However, it is the reduction of palladium oxide in the film to palladium, with the corresponding changes in physical properties, that is relied upon to detect the presence of hydrogen.

The thin palladium oxide containing films, which are the hydrogen sensing devices of this invention are very thin, for example, of the order of 100 A. to 10,000 A. Any method may be used to form the palladium oxide film on a substrate, e.g. vapor disposition or plating of the palladium followed by oxidation of the metal, e.g. at about 450° C. in air. However, one convenient and inexpensive method is to develop the palladium oxide film from a solution of an organometallic compound of palladium, which is painted on a substrate and then fired in air at temperatures at which the film is developed and the oxide is formed.

As noted above, the thin film is on a substrate. The substrate may vary in composition and shape depending on the change in physical characteristic utilized and the particular system chosen. For example, when the device uses a sharp drop in resistance of the film on the reduction of palladium oxide to palladium, the substrate must be dielectric. Suitable materials are glasses, ceramics, plastics, quartz, and combinations of these. Inexpensive glass rod and microscope slides have been found suitable. Where a change in optical properties is utilized, the substrate must be non-reflective. For example transparent glass or plastic may be used.

It is not essential that the palladium oxide containing film be exposed to the atmosphere in which the hydrogen may be present, but it must be exposable to such hydrogen. For example, in one embodiment the palladium oxide containing film is encased between two dielectric members and exposed to the atmosphere at any point, e.g. along the peripheral edge of such assembly; in another embodiment the palladium oxide is entirely encased except for contact with palladium members through which any hydrogen present may diffuse and reach the palladium oxide film. However, in a preferred embodiment the entire surface of the palladium containing film is exposed to the atmosphere under surveillance.

The detector can be used to sense the presence of hydrogen merely by exposing the palladium oxide film to the atmosphere under consideration. In both inert atmospheres and air the reduction of the film is rapid at low concentrations of hydrogen. For example the detector is capable of detecting 2% $H_2$ in air in 5 to 10 minutes at room temperature. At more elevated temperatures the sensitivity of the detectors is greater with respect to both the concentration of the $H_2$ and the response time. The sensitivity of the detector to hydrogen is greater in an inert atmosphere, e.g. nitrogen, than for an oxygen containing atmosphere such as air. The palladium oxide films are not adversely affected by most of the more common contaminants of industrial environments such as methane and carbon dioxide. However a limited number of gases tend to slow down the response time of the detector elements. For example carbon monoxide has been found to affect the film adversely. It is also believed that sulfides would slow the response time of the detectors. If such gases are present in an environment, the stream should preferably be pretreated for removal of such poisons before such stream is contacted with the detectors. Techniques for removal of CO or sulfides from a gast stream are well known. For example CO may be removed by oxidation to $CO_2$ over a suitable catalyst, and sulfides may be removed by reaction with finely divided copper.

PREFERRED EMBODIMENTS

In one embodiment of this invention, the difference of electrical resistance of a palladium oxide and a palladium film is utilized. In this embodiment the film of palladium oxide is deposited on a dielectric substrate across a pair of spaced electrically conductive terminals. On contact with hydrogen the palladium oxide will reduce to palladium and a sharp decrease in the resistance of the film will occur. Simple circuitry, e.g. a circuit containing a voltage divider is used to signal the change in resistance which indicates the presence of hydrogen. For example, in response to the change in resistance of the sensor, a buzzer, light, or safety control device may be activated.

In another embodiment of this invention, the difference in optical properties of a palladium oxide and a palladium film is utilized. Palladium oxide films of the order of 100 to 10,000 A. are transparent and palladium films are reflectors. In this embodiment a thin palladium oxide film is deposited on a non-reflective substrate such as transparent glass. On contact with hydrogen the transparent palladium oxide film reduces to palladium which is a reflector. Well known means such as a photo-electric cell is used to detect this change. As above, the change in optical properties on contact with hydrogen can be used directly to signal the presence of hydrogen.

In another embodiment, which utilizes a change in optical properties, the outer surface of an ordinary electric light bulb is used as the substrate.

DRAWINGS

The invention will be more easily and completely understood by reference to the accompanying drawings wherein are set forth various illustrative embodiments of this invention.

It will be appreciated that the sensing devices of this invention can be used in a great variety of substrates and a great many sizes. Choice will depend on the system in which the sensing element will be incoporated. By way of illustration only two embodiments are shown in FIGS. 1, 2 and 3.

Figure 1:
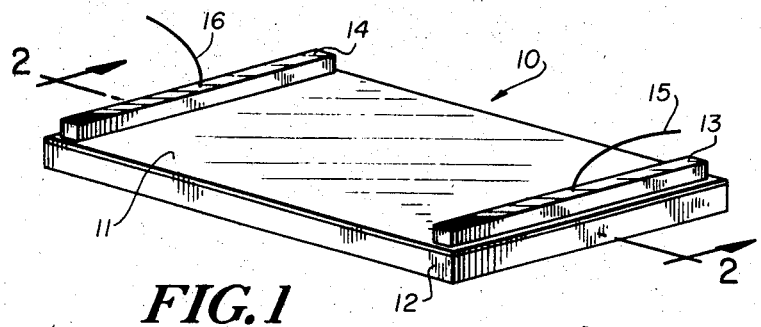
FIG. 1 is a schematic perspective view of one sensing device that may be used in hydrogen detectors of this invention.
Figure 2:
FIG. 2 is a vertical sectional view of the device of FIG. 1 taken along lines 2—2.

In FIGS. 1 and 2 the sensor 10 is comprised of a palladium oxide film 11 of about 250 A. in thickness, on a 3" long x 1" wide glass microscope slide 12. Gold terminals 13 and 14 of about 1000 A. thickness are in contact with the palladium oxide film 11 and leads 15 and 16 are used to connect the sensor 10 into an electric circuit system (not shown) which contains a signal or control means. In FIG. 3 the sensor 20 is comprised of a thin palladium oxide film 21 of the order of 500 A. thickness on a glass rod 22 which is 1/8" diameter x 2" long. Silver terminals 23 and 24 of the order of 0.1 mil thickness are in contact with the palladium oxide film 21. The resistance of the palladium oxide film 21 was increased by increasing the path through the film. This was achieved in sensor 20 by removing portions of the palladium oxide film, but without disturbing a continuous path of the film across the terminals. The area designated as 25 shows that part of the surface of rod 22 which is free of the palladium oxide film. The terminals 23 and 24 are used to connect the sensor to an electric circuit system which contains a signal or control system, as shown diagrammatically in FIG. 4. In FIG. 4 the circuit system C comprises a power source P such as a battery, an alarm A, e.g. a bell or buzzer, and a sensing device of this invention S.

Figure 3:
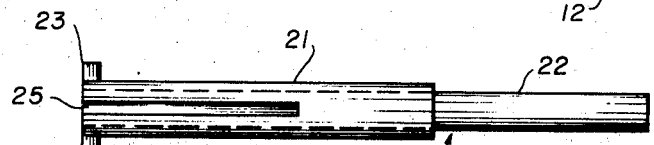
FIG. 3 is a schematic representation of another hydrogen sensing device of this invention.
Figure 4:
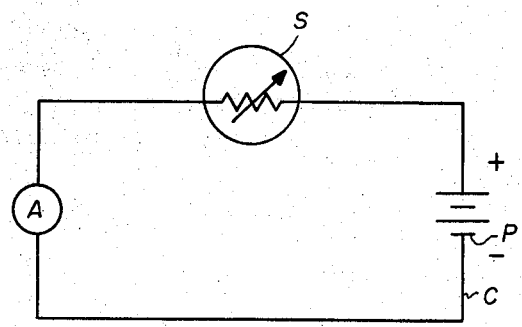
FIG. 4 is a schematic diagram showing the sensing device incorporated in an electric circuit.
Figure 5:
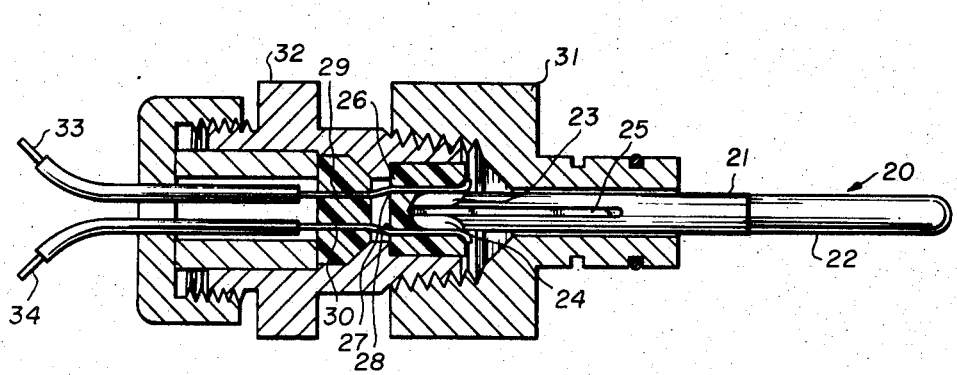
FIG. 5 illustrates a "quick connect" assembly for use in an electrical circuit, such assembly consisting of a hydrogen sensor of the present invention and commercially available fittings.

FIG. 5 shows a sensing device of the type illustrated in FIG. 3 in an assembly designed with commercial fittings for "quick-connection" into a detector system such as shown in FIG. 4. In FIG. 5 sensor 20 is disposed in nylon socket 26 having two holes 27 and 28 drilled therethrough to receive detector wires 29 and 30. The sensor 20 and socket 26 are disposed in a commercial fitting 31, e.g. a "Gra-Tec" quick connect and the fitting 31 is in electrical contact with commercial connector 32, e.g. a "Conax" connector, which has leads 33 and 34 for ready connection into an alarm detector system such as shown in FIG. 4.

As noted above, on contact with hydrogen the thin palladium oxide film reduces to hydrogen and in response to a sharp decrease in resistance the alarm is activated.

Because they are inexpensive and can be made readily replaceable in a system the sensors can be discarded and replaced after transformation to palladium. Alternatively, after reduction to palladium the film can readily be oxidized back to palladium oxide, by firing in air at elevated temperature, e.g. 300 to 500° C.

EXAMPLES

Example 1.—Illustrative method of preparation of a sensor

To form hydrogen sensing devices similar to that shown in FIG. 3, glass rods ⅛" dia. x 2" long were dipped for about ½ their length into a solution containing a palladium resinate dissolved in a mixture of oil of Rosemary, chloroform, and nitrobenzene (2% Pd). The coated rods were fired in air to 450° C. to give a palladium oxide film about 500 A. thick. A silver paste was applied to opposing terminal areas on the films at one end of the rods. The silver was fired in air to 550° C. to form a strong bond with the palladium oxide films.

In order to increase the resistance value, the palladium oxide films were abraded in the area between the silver terminals. This increased the travel path between the terminals. The resultant resistance of the films were about 50,000 to 100,000 ohms and higher.

Example 2.—Performance of sensors

Hydrogen detector assemblies of the "quick connect" type shown in FIG. 5 were used in two different voltage divider circuit systems, each of which contained a buzzer alarm. One system was an AC circuit constructed so that whenever the resistance of the sensor dropped to 7000 ohms, the alarm circuit was activated. The second system was a DC circuit and was made to trigger an alarm at 10,000 ohms.

The amount of time required for a given hydrogen concentration to cause the alarm to go off in the circuit was measured. Faster response indicates greater sensitivity. The alarm terminals of the system were used to provide voltage to stop a timer which was started when the gas was applied to the detector.

The tests showed that 0.1% $H_2$ in $N_2$ could be detected in 5 to 12 minutes, 1.0% $H_2$ in $N_2$ in 2 to 3 minutes, and 2% $H_2$ in air in 7 to 10 minutes. In view of the fact that 2% $H_2$ in air is half the concentration of the lower flammability level, this is a practical and inexpensive method of detecting hydrogen.

Example 3.—Comparative reduction of metal oxides

Using a technique similar to that described in Example 1, various metal oxide thin films were deposited on glass slides. The slides were then contacted with hydrogen at room temperature and at elevated temperatures and the films were observed for change in appearance. The time at which a change was observed within 60 minutes was recorded. If no change was observed within 60 minutes the test was discontinued. The results are tabulated in Table I. The changes in optical characteristics and/or electrical indicate a reduction of the oxide to the metal. It is these changes which are utilized in the detectors of this invention.

TABLE 1

| Film | Temp., ° C. | Time, min. | Remarks |
|---|---|---|---|
| PdO | (¹) | ~0.1 | Transparent to mirror, change in resistance. |
| PbO² | 360 | 44 | Color change to brown. |
| $Co_2O_3$ | 300–315 | 60 | No change. |
| NiO | 370 | 30 | Transparent to mirror, change in resistance. |
| CuO³ | 450 | 30 | Faint optical change, no change in resistance. |
| $Ir_2O_3$ | (¹) | 60 | No change. |
| $Rh_2O_3$ | (¹) | 60 | Slight optical change, small decrease in resistance. |

¹ Room temperature.
² Film composed essentially of PbO and $Bi_2O_3$.
³ Temperatures of 500° C. were required for a rapid definitive change in optical and electrical characteristics.

The unique sensitivity of PdO to $H_2$ can be observed from the results of the tests of Examples 2 and 3. The results in Table I show that even in an atmosphere which is essentially composed entirely of $H_2$, severe temperatures are required to reduce CuO, PbO, and NiO films and the time required for this change is 30 minutes and greater. $Co_2O_3$ films, do not reduce in $H_2$ at temperatures below 300° C. for about an hour. The tests of Example 2 show the rapid response at room temperature of PdO films to low concentrations of $H_2$ even in air.

While particular embodiments of this invention have been shown, it will, of course, be understood that the invention is not limited thereto, since many modifications within the scope of the disclosure will occur to those skilled in the art. It is contemplated by the appended claims to cover any such modifications as fall within the true spirit and scope of this invention.

What is claimed is:
1. A hydrogen detector comprising
   (a) a substrate
   (b) a thin film comprised of palladium oxide or platinum oxide on said substrate, which oxide is exposable to hydrogen and on contact with hydrogen reduces to the corresponding metal, and
   (c) means responsive to a change in electrical or optical characteristics of the thin film;
wherein a change in the physical characteristics of the thin film is utilized to detect the presence of hydrogen.

2. A hydrogen detector of claim 1 wherein the thin film is on a dielectric substrate and the means responsive to a change in characteristics of the thin film utilizes the decrease in electrical resistance of the thin film on the reduction of palladium oxide or platinum oxide to the corresponding metal.

3. A hydrogen detector of claim 1 wherein the thin film is on a non-reflective substrate and the means responsive to a change in physical characteristics of the thin film utilizes the change from a transparent to reflective film on the reduction of palladium oxide or platinum oxide to the corresponding metal.

4. A hydrogen detector of claim 1 wherein the oxide exposable to hydrogen is palladium oxide.

5. A hydrogen detector of claim 1 wherein the thin film has a thickness in the range of about 100 to 10,000 A.

6. A hydrogen detector of claim 5 wherein said thin film is on a glass or ceramic substrate.

7. A hydrogen detector of claim 6 wherein said substrate is in the shape of a rod.

8. A method of detecting the presence of a hydrogen leakage into an oxidizing atmosphere at a hydrogen concentration lower than the lower flammability limit, comprising placing in contact with said oxidizing atmosphere a thin film comprised essentially of palladium oxide or platinum oxide, which oxide is exposable to said hydrogen leakage, and detecting the presence of hydrogen by a means responsive to a change in electrical or optical characteristics of the film, whereby on contact with hydrogen said oxide reduces to the corresponding metal and the means responsive to a resultant change in physical characteristics of the film utilizes such change to detect the presence of hydrogen.

9. A method of claim 8 wherein the presence of hydrogen is detected at room temperature.

10. A method of detecting the presence of hydrogen in an inert atmosphere comprising placing in contact with said inert atmosphere a thin film comprised essentially of palladium oxide or platinum oxide, which oxide is exposable to hydrogen, and detecting the presence of hydrogen by a means responsive to a change in electrical or optical characteristics of the film, whereby on contact with hydrogen said oxide reduces to the corresponding metal and the means responsive to a resultant change in physical characteristics of the film utilizes such change to detect the presence of hydrogen.

11. A method of detecting the presence of hydrogen leakage of claim 8 wherein the oxidizing atmosphere contains gases which poison the palladium or platinum film comprising, pretreating of the atmospheric gases for removal of the poisons and contacting the pretreated gases with the thin film.

References Cited
UNITED STATES PATENTS

| | | | |
|---|---|---|---|
| 2,207,868 | 7/1940 | Martin | 252—472 |
| 3,479,257 | 11/1969 | Shaver | 23—232X |

OTHER REFERENCES

Seiyama et al., Anal. Chem. 38, No. 8, July 1966, 1069–1073.

MORRIS O. WOLK, Primary Examiner

R. M. REESE, Assistant Examiner

U.S. Cl. X.R.

23—232, 254; 73—27; 324—65